(12) United States Patent
Wen et al.

(10) Patent No.: US 9,985,986 B2
(45) Date of Patent: May 29, 2018

(54) UNCONDITIONAL SECURE COMMUNICATION METHOD BASED ON BEAM-FORMING AND SECURITY CODE

(71) Applicant: University of Electronic Science and Technology of China, Chengdu (CN)

(72) Inventors: Hong Wen, Chengdu (CN); Jie Tang, Chengdu (CN); Da Xiang, Chengdu (CN); Huanhuan Song, Chengdu (CN)

(73) Assignee: University of Electronic Science and Technology of China, Changdu (CN)

( * ) Notice: Subject to any disclaimer, the term of this patent is extended or adjusted under 35 U.S.C. 154(b) by 107 days.

(21) Appl. No.: 15/306,094

(22) PCT Filed: Jun. 26, 2015

(86) PCT No.: PCT/CN2015/082424
§ 371 (c)(1),
(2) Date: Oct. 23, 2016

(87) PCT Pub. No.: WO2016/201719
PCT Pub. Date: Dec. 22, 2016

(65) Prior Publication Data
US 2017/0149823 A1  May 25, 2017

(30) Foreign Application Priority Data

Jun. 19, 2015  (CN) .......................... 2015 1 0346922

(51) Int. Cl.
*H04L 29/06* (2006.01)
*H04B 7/06* (2006.01)
*H04B 7/0456* (2017.01)

(52) U.S. Cl.
CPC ....... *H04L 63/1475* (2013.01); *H04B 7/0456* (2013.01); *H04B 7/0617* (2013.01)

(58) Field of Classification Search
CPC .......................... H04L 63/1475; H04B 7/0456
(Continued)

(56) References Cited

U.S. PATENT DOCUMENTS

| 2012/0214404 A1* | 8/2012 | Shany | ...................... H04K 3/43 455/1 |
| 2013/0077514 A1* | 3/2013 | Dinan | .................. H04L 5/0057 370/252 |

(Continued)

FOREIGN PATENT DOCUMENTS

CN          102640447 A       8/2012

OTHER PUBLICATIONS

Huanhuan Song et al., "A Scheme for Improving Security Performance of Multi-user MIMO Broadcast Channel", Communications Technology, Feb. 28, 2015, pp. 135-139, vol. 48, No. 2, ISSN:1002-0802, sections 1-3.

(Continued)

*Primary Examiner* — Eleni A Shiferaw
*Assistant Examiner* — Angela R Holmes
(74) *Attorney, Agent, or Firm* — Gokalp Bayramoglu

(57) ABSTRACT

The present invention discloses an unconditional secure communication method based on beam-forming and security code, which comprises the following steps of: Legitimate users send to the signal pie-encoded and modulated, meanwhile eavesdropper receives signals and calculates the bit error rate; computing security coding parameters, legitimate received users send pilot sequence, and legitimate sending users estimate legitimate channel, and extract information on legal channel coding and modulating signal was SVD pre-coding and sending; the signal was decoded, that will be judgment and demodulation then the signal after decoding do security code is transmitted to message or tapping, due to lack of legal channel information, eaves- (Continued)

dropper cannot lift pre-coding processing of the received signal with the high bit error rate. This method can establish advantages channel of the wiretap model channel and to ensure that legitimate users can receive signals at the lower bit error rate.

3 Claims, 2 Drawing Sheets

(58) Field of Classification Search
USPC .......................................................... 726/26
See application file for complete search history.

(56) References Cited

U.S. PATENT DOCUMENTS

| | | | |
|---|---|---|---|
| 2014/0171856 A1* | 6/2014 | McLaughlin | A61M 5/1723 604/66 |
| 2014/0269591 A1* | 9/2014 | Dinan | H04L 5/0057 370/329 |
| 2015/0134947 A1* | 5/2015 | Varcoe | H04L 9/0858 713/150 |
| 2015/0188662 A1* | 7/2015 | Shapira | H04K 3/825 455/1 |

OTHER PUBLICATIONS

Da Xiang et al., "The Metrix Encoding Method for Security Codes", Network Security Technology & Application, Dec. 31, 2014, pp. 91-92, ISSN: 1009-6833, see the whole document.

Hong Wen et al., "MIMO Cross-Layer Secure Communication Architecture Based on STBC", Global Telecommunications Conference(GLOBECOM 2010), 2010 IEEE Dec. 10, 2010, ISSN: 1930-529X, see the whole document.

* cited by examiner

UNCONDITIONAL SECURE COMMUNICATION METHOD BASED ON BEAM-FORMING AND SECURITY CODE

CROSS REFERENCE TO RELATED APPLICATIONS

This application is the national phase entry of International Application No. PCT/CN2015/082424, filed on Jun. 26, 2015, which is based upon and claims priority to CN 201510346922.2, filed on Jun. 19, 2015, the entire contents of which are incorporated herein by reference.

TECHNICAL FIELD

This invention belongs to the field of information technology security, which especially based on a model of beam-forming and joint secure coding is established for unconditionally secure communication.

BACKGROUND ARTS

Due to the broadcast nature of wireless communication, wireless networks lack of physical boundaries. No physical connection to the external wireless communication is open to eavesdroppers. Addressing security at the physical layer of wireless communication has become necessary to issue a physical layer. Physical layer security technology is based security model of Shannon, which is the solution to the wireless communication boundaries, validity and reliability of theoretical models.

In 1975, tapping channel model was proposed by Wyner in Bell Labs in first time that considered reliable security technology and communication technology communication together. FIG. 1 illustration, Wyner pointed: Only the tapping channel is worse than legitimate channel conditions (i.e. legitimate traffic has basic advantages of the channel). By "security code" to achieve unconditional secret communications is feasible. Wyner's model suggests that "unconditional secret" communication systems through two-step "safety code" to achieve unconditional secret communications is feasible: The first step is to establish legal communication channel conditions which have the better advantage of wiretap channel model, the second step is "secure coding" to "expand" the advantages of legitimate recipient. But Wyner did not give an approach how eavesdropping channel can worse than legitimate channel. Without the implementation of wiretap channel model, not giving "safe coding" encoding method and decoding method, in a very long time Wyner and others' research results have not been given sufficient attention and further development.

Beamforming (beam-forming) is a combination of antenna technology and digital signal processing technology, which purpose for directional signal transmission or reception. A concept derived from the adaptive antenna. Signal processing at the receiving terminal can be synthesized by a weighted multi-element antenna array receives signals from various quarters to become an ideal signal. From the antenna pattern (pattern) perspective, this is equivalent to the formation of a predetermined point on the beam. For example, the original full-conversion reception pattern became a zero point of maximum lobe pattern. The same principal applies to the transmitting terminal The antenna array elements feed amplitude and phase adjustment, and then desired shape pattern can be formed.

When using beam-forming technology, the prerequisite is to use multi-antenna system. For example, multiple input multiple output (MIMO) can be not only multi-receive antenna, but also be used multiple transmit antennas. As a result of using multiple antenna groups, the receiver from a transmitting radio signals corresponding to the same spatial streams (spatial streams), propagates transmission paths in order to achieve the legitimate user of spatial streams to achieve better reception performance. Eavesdropper only receive noise signal in outer space stream, so as to achieve the legitimate communication parties establish the purpose of the advantages of channel, this is establishing the first step in the completion of Wyner model.

SUMMARY OF THE INVENTION

The invention object to overcome the deficiencies of the prior art, which is provided a method of establishing secure communication unconditional secure coding and beam-forming model based on joint. The first realization of the legitimate method establish a communication channel through the model's advantage of multiple antennas, and accept BER difference given specific safety codes encoding and decoding measures based on legitimate users and eavesdroppers. Thus better achieve the establishment of wiretap channel model advantages of the channel and the realization of secure coding to ensure that legitimate users to receive signals at a lower bit error rate.

Object of the invention is achieved by the following technical solution: The unconditional secure communication method based on beam-forming and security code, comprising steps of:

S1: a legitimate receiver sending a training sequence RS to a legitimate transmitter, an RS going through a legitimate channel and an eavesdropping channel respectively, the legitimate transmitter and a passive eavesdropper receiving the RS, where a legitimate channel matrix is H1 and an eavesdropper's channel matrix is H2;

S2: the legitimate transmitter receiving the training sequence $Y_{RS}$ which is transmitted by the legitimate receiver, where the training sequence $Y_{RS}$ is obtained by the training sequence RS which is Rayleigh decayed through the legitimate channel, that is:

$$Y_{RS}=H1*RS+n \quad (1)$$

applying LS algorithm to get uplink channel estimation value H_esti;

$$H\_esti=Y_{RS}*RS^{-1} \quad (2)$$

then transposing the H_esti, that is $(H\_esti)^T$=H1esti;

S3: modulating the bits X'_bits which will be send to by transmitter, and getting the complex modulated symbols X';

S4: extracting CSI from H1esti, that is do SVD decomposition with H1esti:

$$H1esti=U\,DV^H \quad (3)$$

then getting the V as the vector corresponding to the largest singular value, getting the pre-coding matrix W;

S5: doing SVD pre-coding processing for X', then getting W*X', and sending out the pre-coded signal W*X';

S6: the pre-coded signal going through the legitimate channel and eavesdropping channel, and it is received by legitimate receiver and eavesdropping receiver respectively, in which the legitimate receiver receives signal as Y1';

$$Y1'=H1*WX'+n1 \quad (4)$$

the eavesdropper receiving signal as Y2:

$$Y2'=H2*WX'+n2 \quad (5)$$

S7: the legitimate receiver and eavesdropper to recovery the secret bit through signal decision and decoding, respectively:

in receiving side, legitimate receiver doing MMSE decoding on Y1' by multiply matrix He=H1*W:

$$X1'=(He^{-1}He+I*\sigma^2)^{-1}He^{-1}*Y1' \quad (6)$$

then doing decision and demodulated on X1', getting bits streams X'_bits1, then computing the bit error rate BER1' according to X'_bits:

in receiving side, eavesdropper also doing MMSE decoding on Y2' by multiply matrix HE=H2*W:

$$X2'=(HE^{-1}HE+I*\sigma^2)^{-1}HE^{-1}*Y2' \quad (7)$$

then doing decision and demodulated on X2', getting bits streams X'_bits2, then computing the bit error rate BER2' according to X'_bits;

S8: getting the parameters of secret code and choose the proper codes based on BER2';

S9: the transmitter encoding the secret bits X_bits by the secure code, then modulating and getting the complex signal X, and sending W*X signal which is pre-coded by transmitter;

S10: after the legitimate transmitter sending out the pre processed signal, the pre processed signal going through a legitimate channel and a eavesdropping channel, and which is received by the legitimate receiver and eavesdropping receiver, in which the legitimate receiver getting the signal Y1:

$$Y1=H1*WX+n3 \quad (8)$$

and the eavesdropper receiver get signal Y2;

$$Y2=H2*WX+n4 \quad (9)$$

S11: in receiving side, the legitimate receiver and eavesdropper to recovery the secret bits through signal decision and decoding, respectively;

legitimate receiver doing MMSE decoding on Y1 by multiply matrix He=H1*W:

$$X1=(He^{-1}He+I*\sigma^2)^{-1}He^{-1}*Y1 \quad (10)$$

then legitimate receiver doing decision and demodulated on X1, getting bits stream X_bits1, doing secure decoding on X_bits1, getting the secret bits;

eavesdropper also doing MMSE decoding on Y2 by multiply matrix HE=H2*W:

$$X2=(HE^{-1}HE+I*\sigma^2)^{-1}HE^{-1}*Y2 \quad (11)$$

finally, the eavesdropper doing decision and demodulated on X2, getting bits stream X_bits2, then doing secure decoding on X_bits2, getting the eavesdropping secret bits;

the n, n1, n2, n3, n4 are Gaussian white noise, I is unit matrix, and σ is the variance of Gaussian White noise;

the eavesdropper are unknown the Channel information on H1, the bit error rate will be high after processing the received pre-coded signal.

The modulating method said in step S3 can be one of 16QAM, 64QAM, QPSK, 8PSK and BPSK; and the same as step S7 and step S11.

The decision said in step S7 and step S11 is as the soft decision.

The beneficial effects of the invention is: This invention provides an unconditional secure communication model based on beam forming and establishing joint security coding method, the first realization of the legitimate method to establish a communication channel through the model's advantage of multiple antennas, and accept BER difference given specific safety codes encoding and decoding measures based on legitimate users and eavesdroppers. Thus better achieve the establishment of wiretap channel model advantages of the channel and the realization of secure coding to ensure that legitimate users to receive signals at a lower bit error rate. The signal at the transmitting side, Beam-forming using SVD pre-coding scheme combines secure coding measures. In the reception side, it used to lift pre-coding processing scheme beam-forming binding security decoding to recover information bits.

DETAILED DESCRIPTION OF THE PREFERRED EMBODIMENTS

The following detailed description of the drawings further aspect of the present invention bind, but the scope of the present invention is not limited to the following described.

Figure 1:
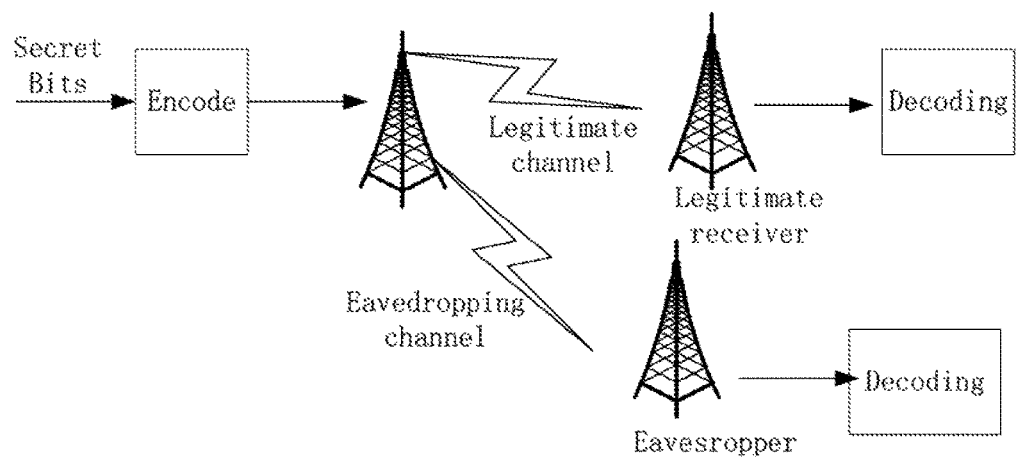
FIG. 1: Wyner eavesdropping channel model.
Figure 2:
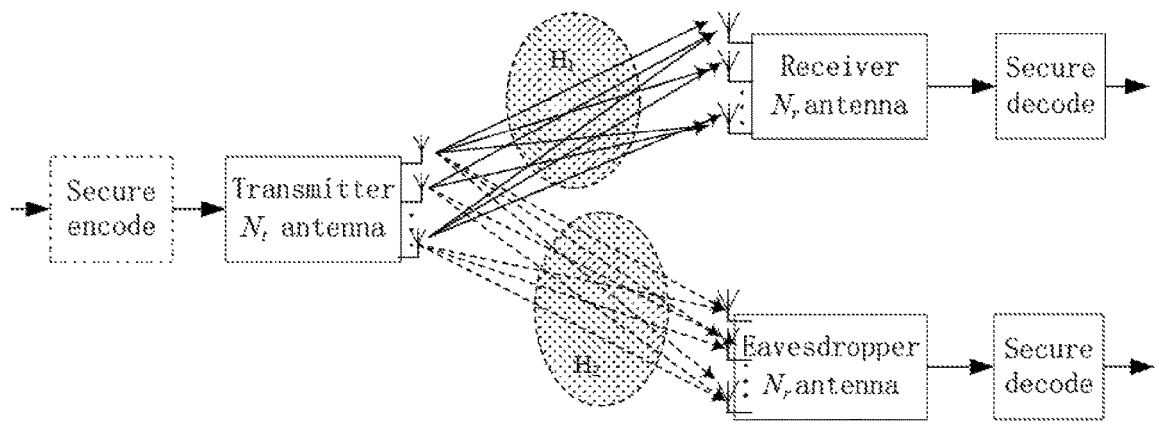
FIG. 2: an unconditional secure communication and secure coding model beam-forming combination.

The present invention uses a beam-forming transmission scheme based on the uplink channel estimation. In the program, suppose that there is a legitimate sender, a legitimate user and a receiving user eavesdropping. Model control of FIG. 1, introduced a security coding to further expand the legitimate user to receive and eavesdropping user error rate gap. Model shown in FIG. 2.

The unconditional secure communication method based on beam-forming and security code, comprising steps of:

S1: the legitimate receiver sending the training sequence RS to the legitimate transmitter, the RS going through the legitimate channel and eavesdropping channel respectively, the legitimate transmitter and passive eavesdropper receiving the RS; where the legitimate channel matrix is H1 and the eavesdropper's channel matrix is H2;

S2: the legitimate transmitter receiving the training sequence $Y_{RS}$ which is transmitted by the legitimate receiver, where the training sequence $Y_{RS}$ is obtained by the training sequence RS which is Rayleigh decayed through the legitimate channel, that is:

$$Y_{RS}=H1*RS+n \quad (1)$$

applying LS algorithm to get uplink channel estimation value H_esti:

$$H\_est=i\ Y_{RS}*RS^{-1} \quad (2)$$

then transposing the H_esti, that is (H_esti)$^T$=H1esti.

S3: modulating the bits X'_bits which will be send to by transmitter, and getting the complex modulated symbols X';

S4: extracting CSI from H1esti, that is do SVD decomposition with H1esti;

$$H1esti=UDV^H \quad (3)$$

then getting the V as the vector corresponding to the largest singular value, getting the pre-coding matrix W, CSI means Channel State Information;

S5: doing SVD pre-coding processing for X', then getting W*X', and sending out the pre-coded signal W*X';

S6: the pre-coded signal going through the legitimate channel and eavesdropping channel, and it is received by legitimate receiver and eavesdropping receiver respectively, in which the legitimate receiver receives signal as Y1';

$$Y1'=H1*WX'+n1 \quad (4)$$

the eavesdropper receiving signal as Y2:

$$Y2'=H2*WX'+n2 \qquad (5)$$

S7: the legitimate receiver and eavesdropper to recovery the secret bit through signal decision and decoding, respectively:

in receiving side, legitimate receiver doing MMSE decoding on Y1' by multiply matrix He=H1*W:

$$X1'=(He^{-1}He+I*\sigma^2)^{-1}He^{-1}*Y1' \qquad (6)$$

then doing decision and demodulated on X1', getting bits streams X'_bits1, then computing the bit error rate BER1' according to X'_bits:

in receiving side, eavesdropper also doing MMSE decoding on Y2' by multiply matrix HE=H2*W:

$$X2'=(HE^{-1}HE+I*\sigma^2)^{-1}HE^{-1}*Y2' \qquad (7)$$

then do decision and demodulated on X2', getting bits streams X'_bits2, then computing the bit error rate BER2' according to X'_bits;

S8: getting the parameters of secret code and choose the proper codes based on BER2';

S9: the transmitter encoding the secret bits X_bits by the secure code, then modulating and getting the complex signal X, and sending W*X signal which is pre-coded by transmitter;

S10: after the legitimate transmitter sending out the pre processed signal, the pre processed signal going through a legitimate channel and a eavesdropping channel, and which is received by the legitimate receiver and an eavesdropping receiver, in which the legitimate receiver getting the signal Y1:

$$Y1=H1*WX+n3 \qquad (8)$$

and the eavesdropper receiver get signal Y2;

$$Y2=H2*WX+n4 \qquad (9)$$

S11: in receiving side, the legitimate receiver and eavesdropper to recovery the secret bits through signal decision and decoding, respectively;

legitimate receiver doing MMSE decoding on Y1 by multiply matrix He=H1*W, then processing Y1 with:

$$X1=(He^{-1}He+I*\sigma^2)^{-1}He^{-1}*Y1 \qquad (10)$$

then legitimate receiver doing decision and demodulated on X1, getting bits stream X_bit1, then doing secure decoding on X_bits1, getting the secret bits;

eavesdropper also doing MMSE decoding on Y2 by multiply matrix HE=H2*W:

$$X2=(HE^{-1}HE+I*\sigma^2)^{-1}HE^{-1}*Y2 \qquad (11)$$

finally, doing decision and demodulated on X2, getting bits stream X_bits2, then doing secure decoding on X_bits2, getting the eavesdropping secret bits;

the n, n1, n2, n3, n4 are Gaussian white noise, I is unit matrix, and σ is the variance of Gaussian white noise;

the eavesdropper are unknown the channel information on H1, the bit error rate will be high after processing the received pre-coded signal.

The eavesdropper are unknown the channel information on H1, the bit error rate of him will be high after processing the received we-coded signal.

The modulating method said in step S3 can be one of 16QAM, 64Q AM, QPSK, 8PSK and BPSK; and the same as step S7 and step S11.

The decision said in step S7 and step S11 as the soft decision. To perform secure decoding on X_bits1, then can get the BER according to X_bits. Perform secure decoding on X_bits2, then can get BER2 according to X_bits.

Figure 3:
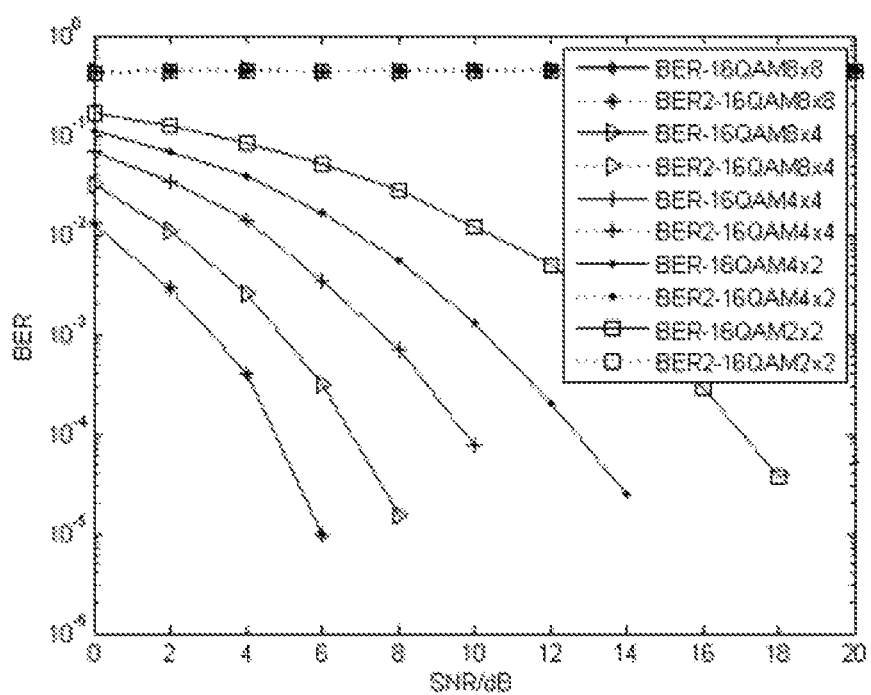
FIG. 3: a different number of antenna receiving user and legal eavesdropping user error rate curve.

When the number of different antennas and different SNR, repeat steps S1-S11, different SNR and calculate BER under a different number of antennas, BER curves plotted, as shown in FIG. 3. From FIG: For legitimate receiving user, the higher SNR, the lower bit error rate. The number of antennas at different, BER different, the more the number of antennas, the lower bit error rate. Legitimate receiving user receives the correct signal higher rates. For users eavesdropping, its error rate approaching 0.5. For binary bit stream is already close to the maximum in terms of error probability. It does not receive valid basic information.

The present invention beam-forming adopts MIMO multiple antenna technology. Since the same information signal can be sent through different paths, and at the receiver side receiver can obtain data symbol plurality of independently faded reproductions. Then diversity gain can be obtained, to ensure better reception reliability, and significantly reduce the error rate. The maximum diversity gain equal to the number of transmitting antennas Nt multiply Nr receive antennas product. Therefore, the larger Nt·Nr, the lower the bit error rate.

On the other hand, because of the model beam-forming legitimate communicating parties getting negotiation, legitimate sender only estimate legitimate users received incoming pilot channel. Before sending the signal, legitimate channel matrix H1 of CSI bits of information to be sent to do the pre-coding processing. At the receiving terminal, while receiving legitimate users and users with the same structure as eavesdropping receiver. Using the same MMSE decoding algorithm. However, with the lack of receiver eavesdropping user information channel H1, due to cannot lift the pre-coding processing of the received signal, so its error rate will be very large. Encoding and decoding safe and secure handling will further increase the error rate difference between the two, so that legitimate users received error rate is smaller. The eavesdropping user error rates more approximate maximum error probability 0.5.

The invention claimed is:

1. An unconditional secure communication method based on beam-forming and security code, comprising steps of:

S1: a legitimate receiver sending a pilot sequence Reference Signal (RS) to a legitimate transmitter, the RS going through a legitimate channel and an eavesdropping channel respectively, the legitimate transmitter and a passive eavesdropper receiving the RS, where a legitimate channel matrix is H1 and an eavesdropper's channel matrix is H2;

S2: the legitimate transmitter receiving a pilot sequence $Y_{RS}$ which is transmitted by the legitimate receiver, where the pilot sequence $Y_{RS}$ is obtained by the pilot sequence RS which is Rayleigh decayed through the legitimate channel, that is:

$$Y_{RS}=H1*RS+n \qquad (1)$$

applying Least Square (LS) algorithm to get uplink channel estimation value H_esti:

$$H\_esti=Y_{RS}*RS^{-1} \qquad (2)$$

then transposing the H_esti, that is $(H\_esti)^T$=H1esti;

S3: modulating a plurality of bits X'_bits which is sent by transmitter, and getting the complex modulated symbols X';

S4: extracting Channel State Information (CSI) from H1esti, that is do Singular Value Decomposition (SVD) with H1esti:

$$H1esti = UDV^H \quad (3)$$

then getting the V as the vector corresponding to the largest singular value getting the pre-coding matrix W;

S5: doing SVD pre-coding processing for X', then getting W*X', and sending out a pre-coded signal W*X';

S6: a pre-coded signal going through the legitimate channel and eavesdropping channel, and it is received by the legitimate receiver and the eavesdropping receiver respectively, in which the legitimate receiver receives signal as Y1':

$$Y1' = H1*WX' + n1 \quad (4)$$

the eavesdropper receiving signal as Y2:

$$Y2' = H2*WX' + n2 \quad (5)$$

S7: the legitimate receiver and the eavesdropper to recover the secret bit through signal decision and decoding respectively:

in receiving side, the legitimate receiver doing MMSE decoding on Y1' by multiply matrix He=H1*W:

$$X1' = (He^{-1}He + I*\sigma^2)^{-1}He^{-1}*Y1' \quad (6)$$

then doing decision and demodulated on X1', getting bits streams X'_bits1, then computing the bit error rate BER1' according to X'_bits;

in receiving side, eavesdropper also doing Minimum Mean Square Error (MMSE) decoding on Y2' by multiply matrix HE=H2*W:

$$X2' = (HE^{-1}HE + I*\sigma^{-2})^{-1}HE^{-1}*Y2' \quad (7)$$

then doing decision and demodulated on X2', getting bits streams X'_bits2, then computing the bit error rate BER2' according to X'_bits ;

S8: getting the parameters of secret code and choose the proper codes based on BER2';

S9: the transmitter encoding the secret bits X_bits by the secure code, then modulating and getting the complex signal X, and sending W*X signal which is pre-coded by transmitter;

S10: after the legitimate transmitter sending out the preprocessed signal, the preprocessed signal going through a legitimate channel and a eavesdropping channel, and which is received by the legitimate receiver and eavesdropping receiver, in which the legitimate receiver getting the signal Y1:

$$Y1 = H1*WX + n3 \quad (8)$$

and the eavesdropper receiver get signal Y2:

$$Y2 = H2*WX + n4 \quad (9)$$

S11: in receiving side, the legitimate receiver and eavesdropper to recovery the secret bits through signal decision and decoding, respectively:

legitimate receiver doing MMSE decoding on Y1 by multiply matrix He=H1*W:

$$X1 = (He^{-1}He + I*\sigma^2)^{-1}He^{-1}*Y1 \quad (10)$$

then doing decision and demodulated on X1, getting bits stream X_bits1, doing secure decoding on X_bits1, getting the secret bits;

eavesdropper also doing MMSE decoding on Y2 by multiply matrix HE=H2*W:

$$X2 = (HE^{-1}HE + I*\sigma^2)^{-1}HE^{-1}*Y2 \quad (11)$$

Finally, the eavesdropper doing decision and demodulated on X2, getting bits stream X_bits2, then do secure decoding on X_bits2, get the eavesdropping secret bits;

the n, n1, n2, n3, n4 are Gaussian white noise, I is unit matrix, and σ is the variance of Gaussian white noise;

the eavesdropper are unknown the channel information on H1, the bit error rate will be high after processing the received pre-coded signal.

2. The unconditional secure communication method based on beam-forming and security code according to claim 1, wherein the modulating ways in step S3, step S7 and step S11 is one of 16 QAM (Quadrature Amplitude Modulation), 64QAM, QPSK (Quadrature Phase Shift Keyin), 8PSK (Phase-Shift Keying) and BPSK (Binary Phase Shift Keying).

3. The unconditional secure communication method based on beam-forming and :security code according to claim 1, wherein the decision in step S7 and step S11 is as the soft decision.

* * * * *